(12) United States Patent
Elhaoussine et al.

(10) Patent No.: US 10,248,947 B2
(45) Date of Patent: Apr. 2, 2019

(54) METHOD OF GENERATING A BANK TRANSACTION REQUEST FOR A MOBILE TERMINAL HAVING A SECURE MODULE

(71) Applicant: OBERTHUR TECHNOLOGIES OF AMERICA CORP., Wilmington, DE (US)

(72) Inventors: Mehdi Elhaoussine, Waltham, MA (US); Eric Lassouaoui, Waltham, MA (US); Julien Traisnel, Waltham, MA (US)

(73) Assignee: OBERTHUR TECHNOLOGIES OF AMERICA CORP., Wilmington, DE (US)

( * ) Notice: Subject to any disclaimer, the term of this patent is extended or adjusted under 35 U.S.C. 154(b) by 451 days.

(21) Appl. No.: 14/753,431

(22) Filed: Jun. 29, 2015

(65) Prior Publication Data

US 2016/0379203 A1    Dec. 29, 2016

(51) Int. Cl.
| | |
|---|---|
| *G06Q 20/32* | (2012.01) |
| *G06Q 20/20* | (2012.01) |
| *G06Q 20/36* | (2012.01) |
| *G06Q 20/38* | (2012.01) |
| *G06Q 20/40* | (2012.01) |

(52) U.S. Cl.
CPC ....... *G06Q 20/3227* (2013.01); *G06Q 20/327* (2013.01); *G06Q 20/3223* (2013.01); *G06Q 20/3226* (2013.01); *G06Q 20/3672* (2013.01); *G06Q 20/3674* (2013.01); *G06Q 20/382* (2013.01); *G06Q 20/3829* (2013.01); *G06Q 20/38215* (2013.01); *G06Q 20/401* (2013.01); *G06Q 2220/00* (2013.01)

(58) Field of Classification Search
CPC .... G06Q 20/322; G06Q 20/32; G06Q 20/401; G06Q 20/40; G06Q 20/3278; G06Q 20/3229; G06Q 20/3674; G06Q 20/3227
See application file for complete search history.

(56) References Cited

U.S. PATENT DOCUMENTS

| | | | |
|---|---|---|---|
| 2009/0117883 A1* | 5/2009 | Coffing | ................... H04W 4/21 455/414.1 |
| 2014/0092897 A1* | 4/2014 | Heatley | ............... H04L 65/1053 370/352 |

(Continued)

FOREIGN PATENT DOCUMENTS

EP    3077972 A1 *  10/2016  ........... G06Q 20/204

*Primary Examiner* — Hao Fu
(74) *Attorney, Agent, or Firm* — MH2 TECHNOLOGY LAW GROUP, LLP

(57) ABSTRACT

The invention provides a method of generating a bank transaction request and a mobile payment terminal hosting a payment application using a secure token for the transaction request and including a secure module. The method comprises the payment application executing a payment protocol with a trader application in order to generate the transaction request, and the payment application requesting an authorization cryptogram from an encryption application hosted in the secure module for verifying authorization of the transaction request in compliance with the payment protocol. The invention also provides the mobile terminal hosting the payment application and including a secure module hosting the encryption application.

18 Claims, 2 Drawing Sheets

(56) References Cited

U.S. PATENT DOCUMENTS

Figure 1:
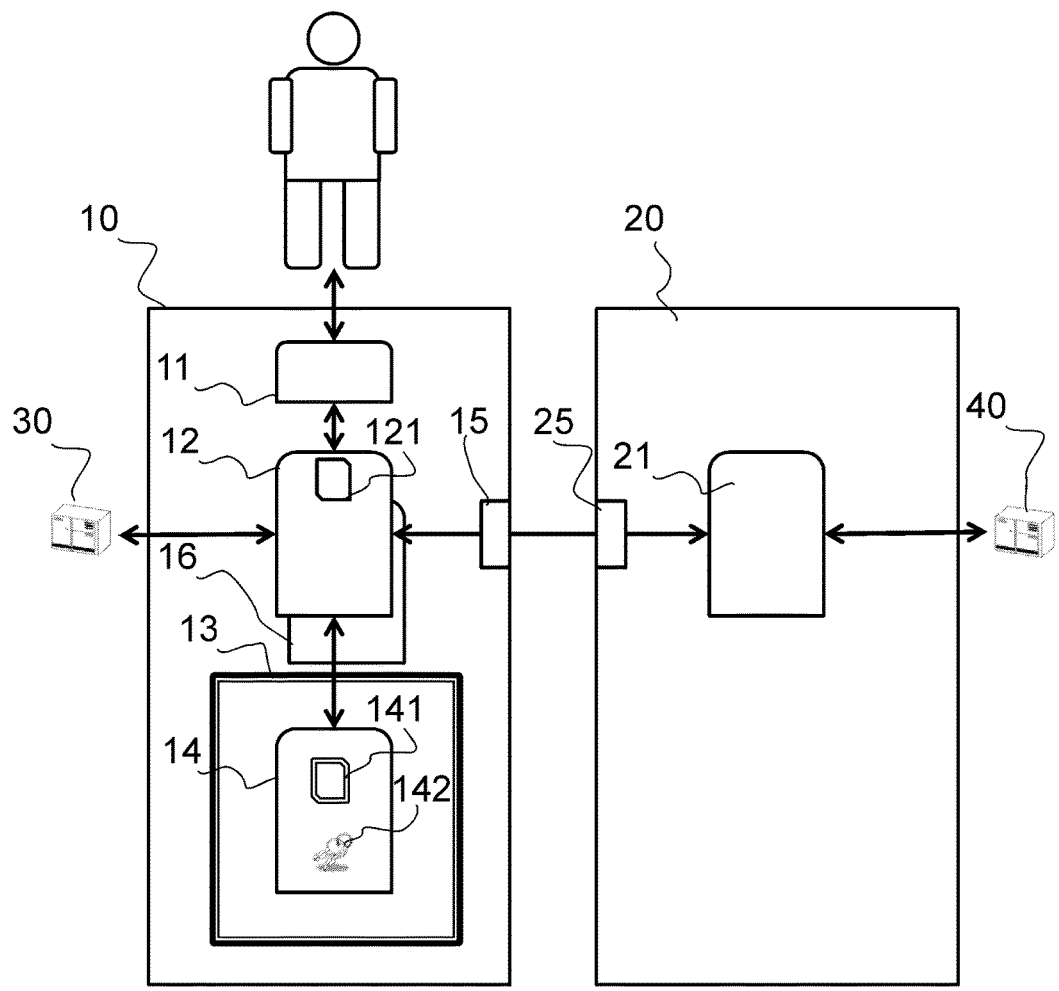

| | | | |
|---|---|---|---|
| 2014/0236842 A1* | 8/2014 | Salminen | G06Q 20/20 |
| | | | 705/75 |
| 2015/0019443 A1 | 1/2015 | Sheets et al. | |
| 2015/0052064 A1* | 2/2015 | Karpenko | G06Q 20/3829 |
| | | | 705/71 |
| 2015/0180836 A1* | 6/2015 | Wong | H04L 9/0869 |
| | | | 713/172 |
| 2015/0332262 A1* | 11/2015 | Lingappa | G06Q 20/3829 |
| | | | 705/71 |
| 2015/0347779 A1* | 12/2015 | Brands | G06F 21/602 |
| | | | 713/164 |
| 2016/0019533 A1* | 1/2016 | Wu | G06Q 20/3674 |
| | | | 705/67 |

* cited by examiner

METHOD OF GENERATING A BANK TRANSACTION REQUEST FOR A MOBILE TERMINAL HAVING A SECURE MODULE

The field of the invention relates to a method of generating a bank transaction request and to a mobile payment terminal hosting a payment application using a secure token for the transaction request.

Bank transactions are being made more and more by means of a purchaser's personal mobile terminal either with a trader's payment station or on-line by means of an application installed on the mobile terminal.

In order to make bank transactions secure, payment systems make use of a secure module embedded in the mobile terminal, e.g. a subscriber identity module (SIM) card that is removable or a secure element that is soldered in place and commonly referred to as an embedded secure element (eSE). The secure module is a microprocessor environment that is isolated from the software environment of the mobile terminal and it executes the payment applications or other sensitive applications.

Patent application US 2015/0052064 A1 describes such a remote payment system using a mobile terminal having a secure module hosting cryptographic means for generating secure tokens used in bank transactions. The payment application is hosted in the secure module and carries out the entire payment protocol with a trader application, and also generates authorization cryptograms and dynamic bank data associated with a payment card of the purchaser.

That system provides good security for protecting the payment applications of operators, but it requires certifications and complex systems for provisioning cryptographic functions. This is problematic for updating payment applications in a secure module, since it is necessary to have recourse to a provisioning and updating system for applications that is expensive. This applies in particular when an operator seeks to update an application identifier, on an application payment option, or to modify the application for generating a secure token.

There also exist payment systems that host payment card emulation applications on remote servers in order to avoid having recourse to a secure module. Such systems are known as hosted card emulation (HCE) systems. A remote server provisions the payment application of a mobile terminal with secure tokens representing a substitute for a payment card of the purchaser. Those payment systems simplify the management of payment applications during their lifetime since they do not require access to an isolated secure module. Nevertheless, they present greater risk when faced with ill-intentioned third parties. Those systems are exposed in particular to software intrusions.

An object of the invention is to propose payment systems that are secure, while improving the management of payment applications during their lifetimes.

More precisely, the invention provides a method of generating a bank transaction request for a mobile payment terminal hosting a payment application using a secure token for the transaction request and including a secure module. According to the invention, the method comprises:

the payment application executing a payment protocol with a trader application in order to generate the transaction request; and the payment application requesting an authorization cryptogram from an encryption application hosted in the secure module for verifying authorization of the transaction request in compliance with the payment protocol.

In a variant, the request for the authorization cryptogram comprises a command for selecting the encryption application from a plurality of encryption applications hosted in the secure module.

In a variant, the payment protocol includes at least selecting the payment application from a plurality of payment applications hosted in the mobile terminal.

In a variant, the payment protocol includes selecting the mode of verifying the transaction authorization.

In a variant, the request for the authorization cryptogram is an EPDU GENERATE AC command defined in compliance with the mode of verifying the transaction authorization.

In a variant, the authorization cryptogram is generated from at least one diversifier transmitted by the trader application, by the payment application, or by a transaction authorization server, and by a key hosted by the secure module.

In a variant, the secure token is transmitted by a provisioning server to the payment application.

In a variant, the trader application is hosted in the mobile terminal.

In another variant, the payment application and the trader application execute a payment protocol in compliance with the ISO/IEC 14443 standard.

The invention also provides a mobile payment terminal hosting a payment application using a secure token for generating a bank transaction request, and including a secure module.

According to the invention, the terminal hosts a payment application for executing a payment protocol with a trader application, and the secure module hosts an encryption application for generating an authorization cryptogram requested by the payment application for verifying authorization of the transaction request in compliance with the payment protocol.

In a variant, the payment application includes means for selecting the encryption application.

In variant, the payment application includes means for selecting the mode of verifying authorization of the transaction.

In a variant, the payment application includes means for generating an APDU GENERATE AC command defined in compliance with the mode of verifying authorization of the transaction, for sending to the encryption application.

In a variant, the payment application is designed to host the secure token, which is transmitted by a provisioning server.

In a variant, the terminal hosts the trader application.

By means of the invention, the payment application and the payment protocol can be updated more easily since the payment application is hosted in the mobile terminal. Generation of the cryptogram is protected by the secure module.

Figure 2:
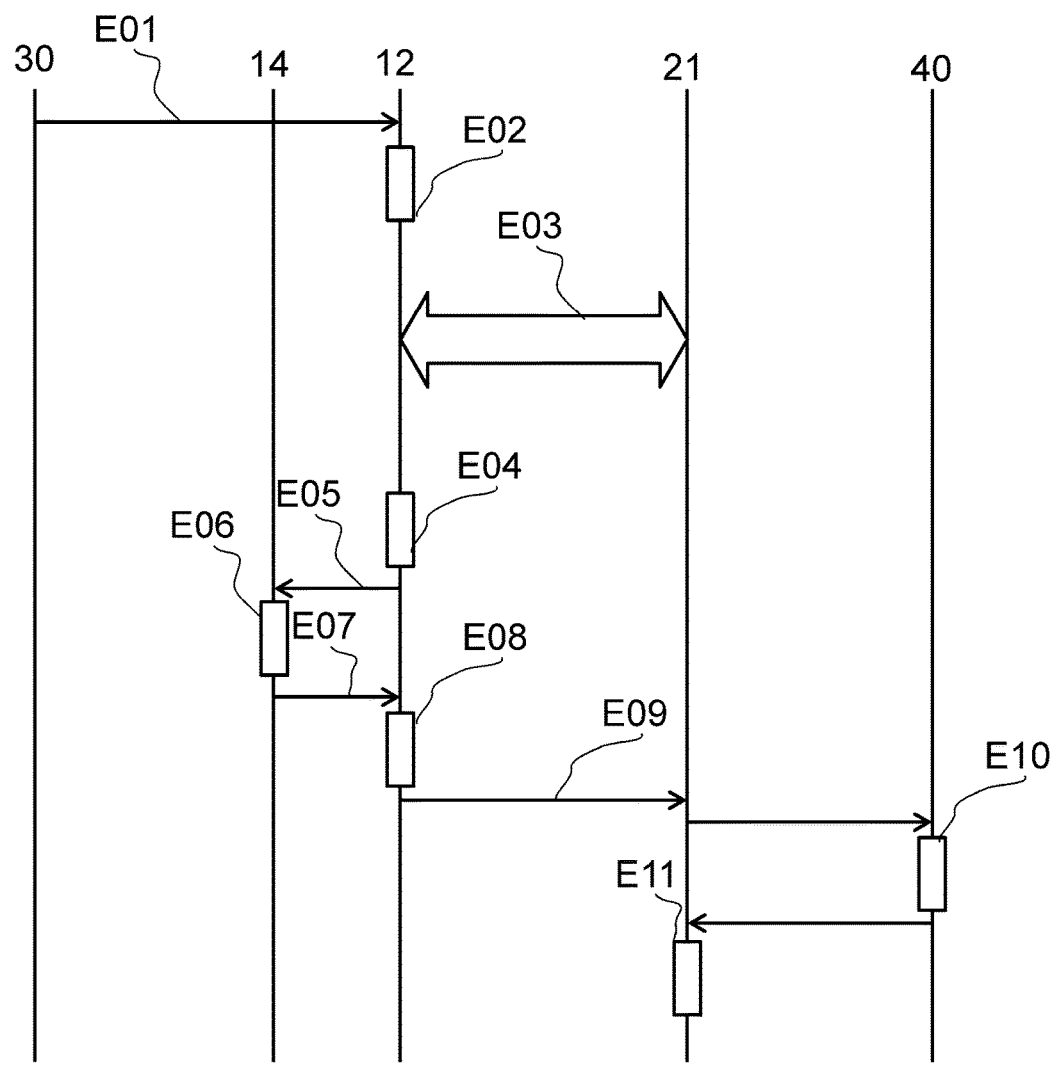

Other characteristics and advantages of the present invention appear more clearly on reading the following detailed description of implementations of the invention given as non-limiting examples and shown in the accompanying drawings, in which:

FIG. 1 shows a mobile terminal having a secure module in accordance with the invention for generating a payment request; and FIG. 2 shows the run of sequences for generating the bank transaction request when making a payment from a mobile terminal.

A bank transaction may be performed by means of the mobile payment terminal of a purchaser as a replacement for a conventional payment card. Furthermore, the invention relates more particularly to payment transactions using a secure token that has been provisioned to the mobile payment terminal prior to the transaction or during the transaction.

FIG. 1 shows a mobile terminal 10 of a purchaser and a payment station 20 of a trader. The mobile payment terminal is a personal electronic device of the user suitable for hosting one or more payment applications 12, 16 operated by a banking institution. The mobile payment terminal 10 comprises a microprocessor and memories enabling a software environment to operate and execute the payment applications 12, 16. A man/machine interface 11 enables the user to interact with the payment applications 12, 16.

The mobile payment terminal 10 may be a mobile telephone, a tablet, or an electronic watch. The mobile terminal is an electronic device that is personal to the purchaser user.

The payment applications 12, 16 carry out a payment protocol with a trader application 21 of a trader station 20. In the description, the invention is described on the assumption that the payment transaction is carried out using the payment application 12 and the trader application 21.

Provision is made for the payment protocol of the application. 12 to use a secure payment token 121 that has previously been transmitted by a provisioning server 30. The payment token is a software substitute for the user's bank data. The secure token may for example be in the form of a temporary primary account number (PAN). The use of a secure token makes it possible to keep the user's bank account secure, since it is characterized by conditions of use that are restricted in terms of duration, amount, destination trader, or number of bank transactions. The authorization server 40, the provisioning server 30, or a control server has software means for determining the identity of the user's bank account and for associating the true bank data with the bank transaction request.

It is possible to envisage that the secure token 121 is transmitted during an initial stage of the purchase prior to generating the bank transaction request. In a variant, the payment application 12 stores one or more secure tokens 121 on the mobile terminal 10.

The mobile terminal 10 hosts a software environment for the payment applications 12, 16 on the mobile terminal 10. This is known as a "mobile wallet" of payment applications. This environment lists the payment applications 12, 16 that are available on the mobile terminal 10. The payment protocol between the application of the trader 21 and the payment application of the mobile terminal 10 provides for an exchange of commands to select an environment for the payment applications 12, 16, an exchange of responses identifying payment applications of the environment, an exchange of commands for selecting a payment application as a function of the response, and selecting a mode of authorizing the transaction request. As an indication, the commands used during the payment protocol between the application 12 and the trader application 21 are SELECT PPSE, RESPONSE AID, SELECT AID, GET PROCESSING OPTION, READ RECORD(s).

It should be observed that the payment application 12 carries out the software functions needed to run a payment protocol in compliance with the ISO/IEC 14443 standard and a Europay Mastercard VISA (EMV) payment protocol, for example. The payment protocol is carried out between the application 12 and the trader application 21. The payment protocol is defined by the bank institution and the instructions for performing it are carried out by the payment applications 12, 16 in co-operation with the trader application 21.

While initiating the payment protocol, the trader payment station 20 determines which of its own trader applications 21 has the protocol that is compatible with the payment application 12 selected as a function of the response giving the list of applications available in the mobile terminal 10. The trader application 21 is in charge of inputting bank transaction data, in particular inputting the amount of the transaction, the location of the transaction, the date of the transaction, and the subject matter of the transaction. The transaction data is input manually by an operator or is input in software manner, in particular by an embedded trader application in the context of on-line payment.

Furthermore, the mobile terminal 10 also has a secure module 13 having its own software environment, which is preferably isolated from the software environment of the mobile terminal 10, or at least to which access is controlled by the user or a trusted authority of the user, e.g. a third party service operator of the bank institution. The secure module 13 is a removable integrated circuit that can be inserted in the mobile terminal 10, e.g. a SIM or it may be an integrated circuit that is soldered in, also known as an eSE. The integrated circuit of the secure module 13 has its own microprocessor and memories for executing software functions of the environment of the encryption application 14.

The secure module 13 hosts one or more encryption applications 14 operating on the software environment specific to the secure module 13. The encryption applications 14 execute operations of generating authorization cryptograms 141 used for verifying authorization of the transaction request in compliance with the payment protocol of a payment application 12, 16. These authorization cryptograms 141 are then transmitted to an authorization server 40 that authorizes or refuses the transaction depending on whether the verification is successful or fails.

An encryption application 14 for generating an authorization cryptogram makes use of a secret key 142 stored in the secure module 13 together with an encryption algorithm (e.g. of the message authentication code (MAC) type (triple data encryption algorithm (DEA)). When generating the authorization cryptogram 141, the secret key is preferably derived using a known rule from the authorization server in order to diversify cryptograms, or the cryptogram may be generated from a random number specific to a transaction and also known to the authorization server. Other encryption algorithms may be used, for example algorithms of the advanced encryption standard (AES) or of the data encryption standard (DES) type.

It should be observed that the secret key is loaded during fabrication of the mobile terminal in a secure environment or else is remotely provisioned via the mobile telephone network in a manner that is considered to be secure.

Provision may be made for the authorization cryptograms to be generated from data that is personal to the purchaser, unique to the purchaser, and also known to the authorization server 40. The personal data may be a biometric print, a personal code, or a secret phrase, e.g. as exchanged during an initial stage of the user registering with the payment service.

It should be observed that the payment applications 12, 16 hosted by the mobile terminal 10 make use of the encryption application 14 hosted by the secure module 13 in order to generate an authorization cryptogram 141. Calling on the encryption application 14 is preferably conditional on inputting a personal code, verifying a fingerprint, or verifying the payment application by means of a certificate that can be verified by the secure module.

An interface 15 of the mobile terminal 10 enables the mobile terminal 10 to exchange information with the outside in order to transmit commands of the payment protocol carried out by the payment applications 12, 16. In a variant, the interface 15 is a short-range wireless communication interface in compliance with the ISO/IEC 14443 standard in order to perform near field communication (NFC) type payments with a trader payment station 20. In another variant, the interface 15 is a wireless communication interface of a mobile telephone network.

The trader station 20 has a communication interface 25 for short range wireless communication corresponding to the ISO/IEC 14443 standard or for long range communication (mobile telephone network) and co-operating with the communication interface 15 in order to execute the payment protocol between the payment application 12 and the trader application 21.

In a variant, the trader station 20 and the trader application 21 are application entities embedded in the mobile terminal 10, or extension modules or "plugins" of an Internet browser of the mobile terminal 10. It may be a purchasing application or a browser plugin specific to a trader installed on the mobile terminal 10. The interface 15 and the interface 5 are then communication interfaces internal to the terminal 10, making use of the internal data communication bus and software interfaces between two applications of the mobile terminal 10. By way of example, the application communicates via application programming interface (API) interfaces. Under such circumstances, the payment protocol is carried out between an application 12 and an application 21, both hosted on the mobile terminal 10.

It is possible to envisage that the trader application 21 is an on-line application hosted on a remote server.

The payment system provides the server 40 for authorizing a bank transaction, which has the function of verifying the authorization cryptogram 141. The server 40 has cryptographic means that co-operate with the encryption application 14 of the secure module 13 in order to generate in parallel the same cryptogram from the bank transaction data and the personal data of the purchaser. The authorization cryptogram of the server is generated in a protected environment. The authorization cryptogram 141 and the authorization cryptogram of the server are compared in order to validate or to refuse the transaction.

It is possible to envisage that the same server recovers the bank data of the purchaser from the secure token 121. The step of recovering the user's bank data from the secure token 121 is performed before verifying the authorization cryptogram 141. In a variant, the authorization cryptogram 141 is verified during the same verification process as that of verifying the secure token 121.

FIG. 2 shows the steps of the payment protocol for generating the bank transaction request sent by the payment application 12 of the mobile payment terminal 10 to a trader application 21 of a payment station 20.

In a first step E01, a secure token 121 is provisioned for the payment application 12, e.g. during an initial stage of a purchase or during a stage serving specifically to provision a secure token.

In a second step E02, the purchaser initiates a purchase and a process of generating a bank transaction request. By means of the interface 11, the purchaser accesses the wallet hosting the payment applications 12, 16 and selects the payment application 12. In a variant, the payment process may be initiated from the trader application 21, in particular when it is hosted in the mobile terminal 10.

If the trader application 21 is hosted on an external trader station 20, it may be necessary for the user to bring the mobile terminal 10 close thereto in order to begin exchanging the first commands of the payment protocol between the payment application 12 and the trader application 21 via the interfaces 15, 25. If the trader application 12 is hosted in the terminal 10, then the commands of the payment protocol are exchanged via software protocols of the mobile terminal 10.

In a third step E03, the payment protocol provides for a succession of exchanges of commands for selecting the payment application on the mobile terminal 10 and on the trader station 20. The payment applications 12 and 21 are selected so that they can carry out a payment protocol that is compatible with both of them.

For example, in the context of an ISO/IEC 14443 payment protocol or of an on-line payment, the trader application 21 transmits a SELECT PPSE command to select the payment software environment, and then the mobile terminal 10 returns an identifier of the payment application 12.

Provision is made for the payment protocol to include selecting the mode for verifying transaction authorization. For this purpose, commands for selecting payment options and for selecting the mode of verifying payment transaction authorization are exchanged between the payment application 12 and the trader application 21. For example, the authorization verification mode provides for on-line verification during the transaction carried out by the authorization server 40, or off-line verification that is to be executed by the authorization server after the transaction has been executed. The authorization verification mode may provide for inputting a personal code of the user.

It should be observed that the same payment protocol commands may be carried out if the trader application is hosted on the mobile terminal 10. The payment protocol may vary depending on the payment application selected on the mobile terminal 10. A payment protocol may vary with respect to the mode of verifying authorization, for example.

While the payment protocol is being carried out, the trader application 21 transmits a request to generate an authorization cryptogram. This request is preferably accompanied by a cryptogram diversifier together with bank transaction data (e.g. amount, date, currency, country) that is also transmitted to the authorization server in order to generate the verification cryptogram in parallel in the authorization server 40.

In a fourth step E04, the method comprises the payment application 12 requesting an authorization cryptogram 141 from an encryption application 14 hosted in the secure module 13 for the purpose of verifying authorization of the transaction request in compliance with the payment protocol being carried out by the payment application 12. The payment application processes the request sent by the trader application 21 to generate or retransmit a generation command to the secure module 13. In a variant, the request 141 is an application protocol data unit (APDU) command of the GENERATE AC type. The generation request may be sent after verifying a personal code of the user. It should be observed that the APDU GENERATE AC command is defined in accordance with the authorization verification mode of the transaction.

The payment application 12 includes software means (a software function or an application) for generating the GENERATE ACT command.

Provision may be made for the generation request to include a random number or data personal to the user (fingerprint, personal identification number (PIN), personal cryptogram) depending on the authorization verification mode provided for in the payment protocol. In a variant, the secure token 121 accompanies the cryptogram generation request in order to be included during encryption.

In a variant, the generation request includes an application identifier in order to select the encryption application 14. It may be envisaged that the secure module 13 hosts a plurality of encryption applications depending on the payment protocol carried out by the payment applications 12, 16. For example, one encryption application may correspond specifically to a payment application in compliance with the payment protocol of the bank entity. By way of example, the cryptogram generation request may include an identifier for a key or an encryption algorithm.

It is also possible to envisage that a plurality of payment applications of the mobile terminal 10 call the same encryption application 14. The authorization server 40 is then used by a third party service on behalf of a plurality of banks or financial institutions in order to verify the transaction request. It may be observed that the transaction request may be made secure by a plurality of authorization verifications.

In step E05, the request is transmitted from the payment application 12 to the encryption application hosted in the secure module 13.

In step E06, the encryption application 14 generates an authorization cryptogram 141 in compliance with the generation request from the payment protocol. The authorization cryptogram 141 is generated from the diversifier and from a key hosted by the secure module 13. It may be observed that the diversifier is transmitted by the trader application 21, or in another variant, by the payment application 12, or indeed by the transaction authorization server 40.

Thereafter, the authorization cryptogram 141 is transmitted in a step E07 to the payment application 12. Generating the cryptogram in the secure module makes it possible to ensure that the encryption algorithms and the secret data needed for generating it are protected. The invention thus provides greater protection for the secret data.

In a step E08, the payment application 12 generates the bank transaction request from the transaction data (amount, date, currency, etc., . . . ), the authorization cryptogram 141, the secure token 121, which may possibly be encrypted by the encryption application 14.

In a step E09, the bank transaction request is transmitted by the payment application 12 to the trader application 21 which retransmits it to the authorization server 40 in order to verify the authorization.

In a step E10, the authorization server carries out one or more authorization verifications on the bank transaction request sent by the payment application, on the authorization cryptogram 141, and on the secure token 121. If verification is successful, the authorization server 40 transmits a validation of the bank transaction to the trader application 21. The mode of verifying authorization of the authorization cryptogram 141 may be determined as a function of the secure token 121 or of the bank data that can be deduced from the secure token.

In a step E11 the trader is informed of the result of the bank transaction request and the sale is then authorized. The sale is authorized on-line (via an application) or directly with the trader if the transaction has taken place in the trader's premises.

By means of the invention, the payment protocol is carried out by an application hosted in the mobile terminal 10, which makes it easier to update the payment application during its lifetime. Nevertheless, generation of the authorization cryptogram is hosted in the secure module 13, thereby enabling the secret information to be protected from an ill-intentioned third party.

The invention claimed is:

1. A method of generating a transaction request using a mobile payment terminal hosting a payment application and including a secure module, the method comprising:
   the payment application receiving a secure token from a provisioning server, the secure token representing bank data of a user of the mobile payment terminal;
   the payment application executing a payment protocol with a trader application;
   the payment application requesting an authorization cryptogram from an encryption application hosted in the secure module for verifying authorization of the transaction request in compliance with the payment protocol;
   the encryption application generating the authorization cryptogram from a diversifier transmitted by the trader application, the payment application, or an authorization server and by a key hosted by the secure module; and
   the payment application generating the transaction request using the authorization cryptogram and the secure token.

2. A method according to claim 1, wherein the request for the authorization cryptogram comprises a command for selecting the encryption application from a plurality of encryption applications hosted in the secure module.

3. A method according to claim 1, wherein executing the payment protocol includes at least selecting the payment application from a plurality of payment applications hosted in the mobile payment terminal.

4. A method according to claim 1, wherein executing the payment protocol includes selecting a mode of verifying the authorization of the transaction request.

5. A method according to claim 4, wherein the request for the authorization cryptogram includes an APDU GENERATE AC command defined in compliance with the mode of verifying the authorization of the transaction request.

6. A method according to claim 1, wherein the trader application is hosted in the mobile payment terminal.

7. A method according to claim 1, wherein the payment application and the trader application execute the payment protocol in compliance with the ISO/IEC 14443 standard.

8. A method according to claim 1, wherein the payment application hosts the secure token.

9. A mobile payment terminal, comprising:
   a processor configured to execute a payment application; and
   a secure module that is operably connected to the processor and configured to host an encryption application,
   wherein the payment application is configured to:
      receive a secure token from a provisioning server, the secure token representing bank data of a user of the mobile payment terminal;
      execute a payment protocol with a trader application;
      request an authorization cryptogram from the encryption application for verifying authorization of the transaction request in compliance with the payment protocol; and
      generate a transaction request using the authorization cryptogram and the secure token, and
   wherein the encryption application is configured to generate the authorization cryptogram from a diversifier transmitted by the trader application, the payment application, or an authorization server and by a key hosted by the secure module.

10. A mobile payment terminal according to claim 9, wherein the request for the authorization cryptogram comprises a command for selecting the encryption application from a plurality of encryption applications hosted in the secure module.

11. A mobile payment terminal according to claim 9, wherein the payment application is configured to select a mode of verifying authorization of the transaction request.

12. A mobile payment terminal according to claim 11, wherein the request for the authorization cryptogram includes an APDU GENERATE AC command defined in compliance with the mode of verifying the authorization of the transaction request.

13. A mobile payment terminal according to claim 9, wherein the payment application is configured to host the secure token.

14. A mobile payment terminal according to claim 9, wherein the mobile payment terminal hosts the trader application.

15. A mobile payment terminal according to claim 9, wherein the payment application is configured to select the payment application from a plurality of payment applications hosted in the mobile payment terminal.

16. A mobile payment terminal according to claim 9, wherein the payment application and the trader application execute the payment protocol in compliance with the ISO/IEC 14443 standard.

17. A method for generating a transaction request by a mobile terminal hosting a payment application, comprising:
receiving a secure token from a provisioning server;
generating an authorization cryptogram by an encryption application hosted in a secure module of the mobile terminal, the authorization cryptogram generated for verifying authorization of the transaction request in compliance with a payment protocol;
generating the transaction request using the authorization cryptogram and the secure token;
transmitting the transaction request to a trader application for authorization verification,
wherein generating the authorization cryptogram comprises generating the authorization cryptogram from a diversifier transmitted by the trader application, the payment application, or an authorization server and by a key hosted in the secure module.

18. The method of claim 17, receiving from an authorization server an authorization verification result of the transaction request.

* * * * *